(12) United States Patent
Davies

(10) Patent No.: US 8,321,646 B2
(45) Date of Patent: Nov. 27, 2012

(54) METHOD AND APPARATUS FOR REBALANCING STORAGE COMPONENTS WITHIN A STORAGE TIER

(75) Inventor: Ian Robert Davies, Longmont, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 322 days.

(21) Appl. No.: 12/898,203

(22) Filed: Oct. 5, 2010

(65) Prior Publication Data

US 2011/0252210 A1    Oct. 13, 2011

Related U.S. Application Data

(60) Provisional application No. 61/323,625, filed on Apr. 13, 2010.

(51) Int. Cl.
*G06F 13/10* (2006.01)
(52) U.S. Cl. ...................................................... 711/165
(58) Field of Classification Search .................. None
See application file for complete search history.

(56) References Cited

U.S. PATENT DOCUMENTS 7,224,604 B2 * 5/2007 Lasser ....................... 365/185.09

OTHER PUBLICATIONS

Related U.S. Appl. No. 12/897,948 "Method and apparatus for choosing storage components within a tier", filed Oct. 5, 2010.

* cited by examiner

*Primary Examiner* — Duc Doan
(74) *Attorney, Agent, or Firm* — Thomas J. Lavan

(57) ABSTRACT

A method for a storage controller to rebalance storage components within a storage tier is provided. The method maintains a linked list for each component, and each component includes a plurality of pages. Each linked list is ordered according to hot and cold pages and includes an identifier for each page. The method calculates a percent range of hot and cold pages for each component, and identifies a fullest and least full component. The method compares a random percent to the hot and cold percent ranges for the fullest component. If the random percent falls within the hot range, the method moves a selected hot page from the fullest component to an empty page in the least full component. If the random percent falls within the cold range, the method moves a selected cold page from the fullest component to an empty page in the least full component.

20 Claims, 12 Drawing Sheets

Rebalance of components (reorder pages)

Fig. 4a
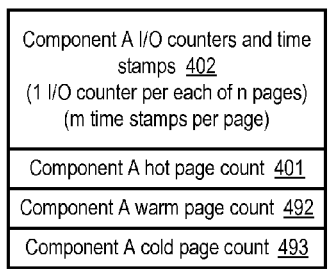
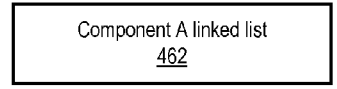
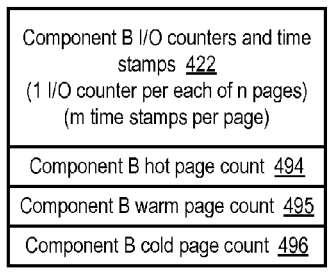
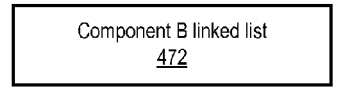
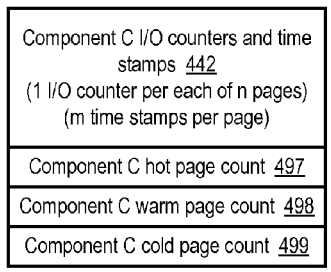
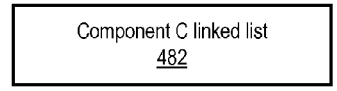

Fig. 4b 220,320

| 402 Component A I/O counters and time stamps |
|---|
| Page 0 I/O counter 403 |
| Page 0 time stamp 0  409 |
| Page 0 time stamp 1  410 |
| Page 1 I/O counter 404 |
| Page 1 time stamp 0 411 |
| Page 1 time stamp 1  412 |
| Page 2 I/O counter 405 |
| Page 2 time stamp 0  413 |
| Page 2 time stamp 1  414 |
| • • • |
| Page n-2 I/O counter 406 |
| Page n-2 time stamp 0  415 |
| Page n-2 time stamp 1  416 |
| Page n-1 I/O counter 407 |
| Page n-1 time stamp 0  417 |
| Page n-1 time stamp 1  418 |
| Page n I/O counter 408 |
| Page n time stamp 0  419 |
| Page n time stamp 1  420 |

| 422 Component B I/O counters and time stamps |
|---|
| Page 0 I/O counter 423 |
| Page 0 time stamp 0  429 |
| Page 0 time stamp 1  430 |
| Page 1 I/O counter 424 |
| Page 1 time stamp 0 431 |
| Page 1 time stamp 1  432 |
| Page 2 I/O counter 425 |
| Page 2 time stamp 0  433 |
| Page 2 time stamp 1  434 |
| • • • |
| Page n-2 I/O counter 426 |
| Page n-2 time stamp 0  435 |
| Page n-2 time stamp 1  436 |
| Page n-1 I/O counter 427 |
| Page n-1 time stamp 0  437 |
| Page n-1 time stamp 1  438 |
| Page n I/O counter 428 |
| Page n time stamp 0  439 |
| Page n time stamp 1  440 |

| 442 Component C I/O counters and time stamps |
|---|
| Page 0 I/O counter 443 |
| Page 0 time stamp 0  449 |
| Page 0 time stamp 1  450 |
| Page 1 I/O counter 444 |
| Page 1 time stamp 0 451 |
| Page 1 time stamp 1  452 |
| Page 2 I/O counter 445 |
| Page 2 time stamp 0  453 |
| Page 2 time stamp 1  454 |
| • • • |
| Page n-2 I/O counter 446 |
| Page n-2 time stamp 0  455 |
| Page n-2 time stamp 1  456 |
| Page n-1 I/O counter 447 |
| Page n-1 time stamp 0  457 |
| Page n-1 time stamp 1  458 |
| Page n I/O counter 448 |
| Page n time stamp 0  459 |
| Page n time stamp 1  460 |

Fig. 5a                Generation of loose linked list per component
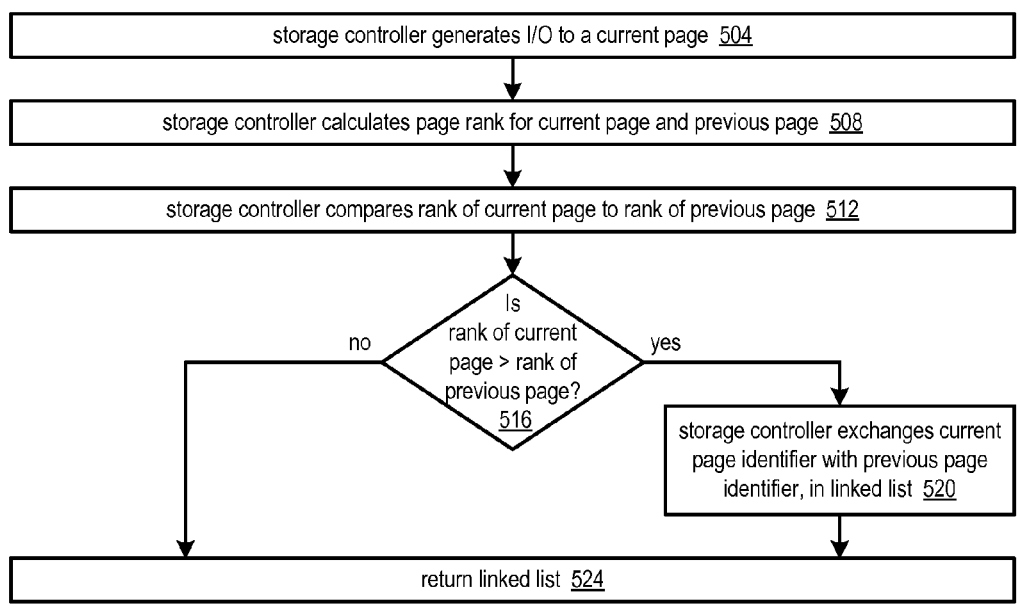

Fig. 5b    Generation of loose linked list per component
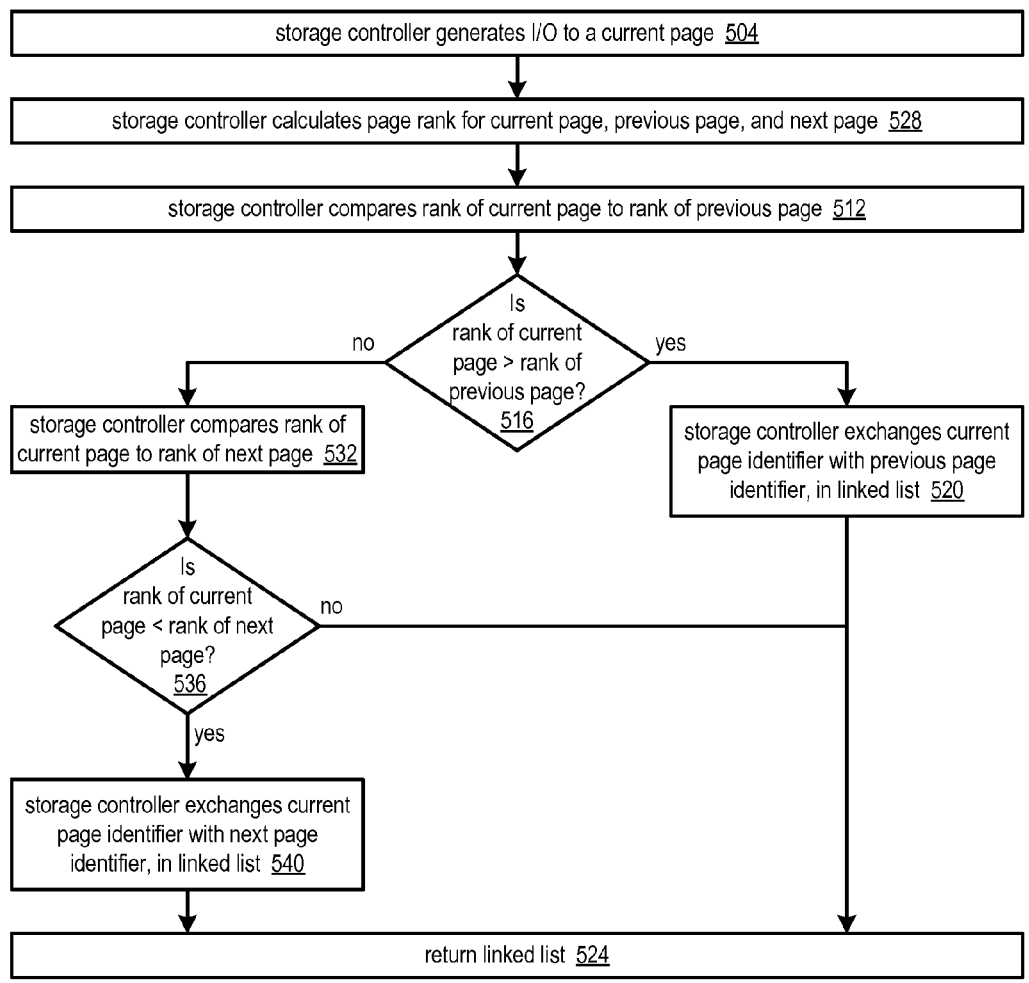

Fig. 6    Page rank calculation
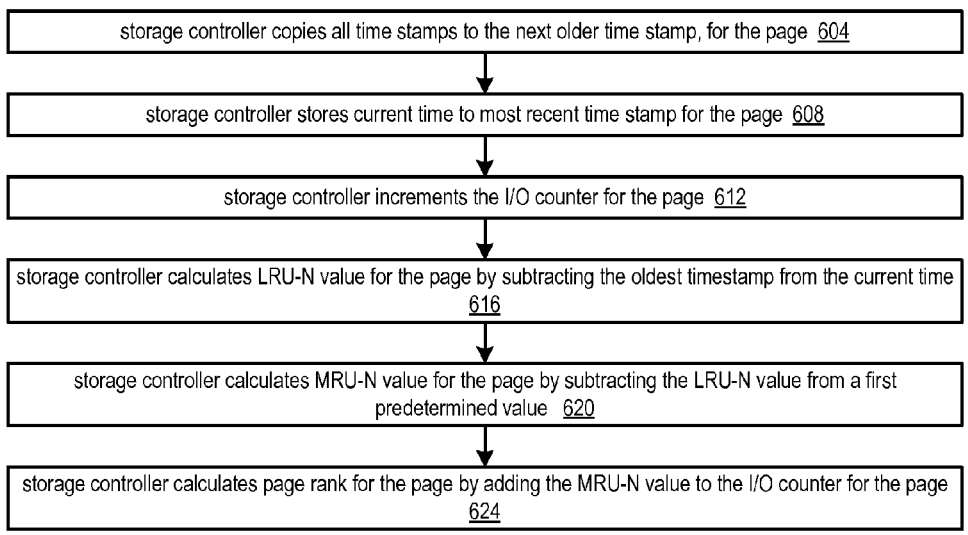

Fig. 8     Rebalance of components (reorder pages)

METHOD AND APPARATUS FOR REBALANCING STORAGE COMPONENTS WITHIN A STORAGE TIER

CROSS REFERENCE TO RELATED APPLICATION(S)

This application claims the benefit of pending U.S. Provisional Application Ser. No. 61/323,625 filed Apr. 13, 2010, entitled METHOD AND APPARATUS FOR CHOOSING STORAGE COMPONENTS WITHIN A TIER, which is hereby incorporated by reference for all purposes and which were owned or subject to an obligation of assignment to Dot Hill Systems Corporation at the time the invention claimed herein was made. This application is related to pending Non-Provisional U.S. application Ser. No. 12/897,948, filed Oct. 5, 2010, entitled METHOD AND APPARATUS FOR CHOOSING STORAGE COMPONENTS WITHIN A TIER (inventor Ian Robert Davies).

FIELD

The present invention is directed to computer data storage. In particular, the present invention is directed to methods and apparatuses for rebalancing allocated storage pages among a group of storage components within a storage tier.

BACKGROUND

Computers utilize a variety of data storage approaches for mass data storage. Various types of data storage devices and organization of groups of data storage devices are used to provide primary storage, near line storage, backup storage, hierarchical storage, and various types of storage virtualization and data replication.

Data storage devices include tape storage, disk drives, optical drives, and solid state disks. In terms of performance, solid state disks provide the best performance, followed by hard disk drives. Optical and tape storage devices provide significantly slower performance compared to hard disk drives and solid state disks.

Within a given storage device type, various storage devices may have different performance attributes. For example, hard disk drives come in multiple rotation speeds, cache sizes, track density, and other physical parameters. Rotation speeds of 5,400, 7,200, 10,000, and 15,000 RPM are currently available, with cache sizes ranging from 32 MB (Megabytes) to 8 GB (Gigabytes) and more. Therefore, it is possible to create sub-groups of a particular storage device type based on performance attributes of each sub-group.

Although it would be desirable to have unlimited amounts of the fastest possible data storage, in most cases that approach is cost prohibitive and a waste of money. Solid state disks, for example, make a very inefficient choice for offline data storage, where data can often be written off-hours when data networks and servers are lightly used, and the content is rarely accessed. Additionally, data storage needs almost always increase over time in order to accommodate new data to be stored, backed up, virtualized, and so on.

SUMMARY

The present invention is directed to solving disadvantages of the prior art. In accordance with embodiments of the present invention, a method for a storage controller to rebalance a plurality of storage components within a storage tier is provided. The method includes maintaining a linked list for each component in the plurality of storage components in the storage tier. Each component comprises a plurality of pages. The linked list for each component comprises a plurality of identifiers corresponding to the plurality of pages. The linked list is ordered according to hot and cold pages. The method calculates a percent range of hot pages and cold pages in the linked list for each component in the plurality of storage components, and identifies a fullest component and a least full component within the plurality of storage components. Next, the method generates a random percent between zero percent and one hundred percent, and compares the random percent to the hot percent range to the cold percent range for the fullest component. If the random percent falls within the hot percent range, the method selects a hot page from the fullest component and moves the selected hot page in the fullest component to an empty page in the least full component. If the random percent falls within the cold percent range, the method selects a cold page from the fullest component and moves the selected cold page in the fullest component to an empty page in the least full component.

In accordance with another embodiment of the present invention, a storage controller for rebalancing a plurality of storage components within a storage tier is provided. The storage controller includes a memory including a linked list for each of the plurality of storage components. The linked list includes a plurality of identifiers for hot pages and cold pages. The linked list is ordered according to the hot and cold pages. The storage controller includes an interface to the storage tier. The storage tier includes the plurality of storage components, and each of the plurality of storage components includes a plurality of pages. The storage controller also includes a processor, coupled to the memory and the interface. For each storage component in the plurality of storage components, the processor maintains the linked list, calculates a percent range of hot pages and cold pages in the linked list, identifies a fullest component and a least full component, and generates a random percent between zero percent and one hundred percent. The storage controller compares the random percent to the hot percent range to the cold percent range for the fullest component. If the random percent falls within the hot percent range, the processor selects a hot page from the fullest component and moves the selected hot page in the fullest component to an empty page in the least full component. If the random percent falls within the cold percent range, the processor selects a cold page from the fullest component and moves the selected cold page in the fullest component to an empty page in the least full component.

An advantage of the present invention includes an efficient means of balancing data access to a plurality of storage components so that storage components are used approximately equally. Storage tier performance is maximized when storage components are balanced. Another advantage of the present invention is it provides an automatic means to balance storage components, without user or system administrator involvement. Once invoked, storage components gradually and automatically migrate to a balanced page allocation. Another advantage is the present invention can be used anytime—when a new storage tier is brought online, when a new component is added to a storage tier, or after a storage tier has been in regular and heavy use for an extended period of time. Another advantage is the method of the present invention provides a minimal computational load to a storage controller, especially is an unused or rarely used floating point arithmetic unit is used.

Additional features and advantages of embodiments of the present invention will become more readily apparent from the following description, particularly when taken together with the accompanying drawings.

BRIEF DESCRIPTION OF THE DRAWINGS

FIG. 4a is a top-level block diagram illustrating data structures in memory in accordance with the preferred embodiment of the present invention.

FIG. 4b is a detailed block diagram illustrating I/O counters and time stamps in accordance with the preferred embodiment of the present invention.

FIG. 5a is a flowchart illustrating a method for generating a loose linked list per storage component in accordance with a first embodiment of the present invention.

FIG. 5b is a flowchart illustrating a method for generating a loose linked list per storage component in accordance with a second embodiment of the present invention.

FIG. 6 is a flowchart illustrating a method for calculating page rank in accordance with the preferred embodiment of the present invention.

DETAILED DESCRIPTION

Figure 1A:
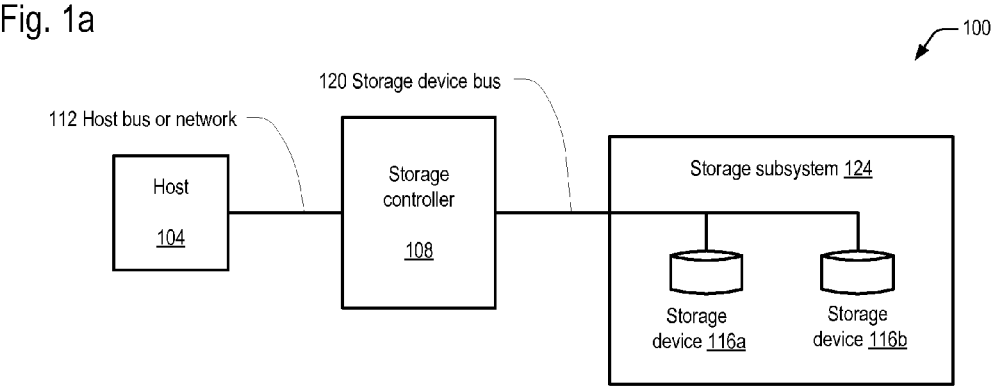
FIG. 1a is a block diagram illustrating components of a first non host-based electronic data storage system in accordance with embodiments of the present invention.

The present invention is directed to the problem of automatically selecting a storage component from a plurality of storage components within a storage tier. In a preferred embodiment, a RAID controller performs the selection of storage components. Either RAID controller hardware or firmware running on a CPU of the RAID controller performs the invention. In other embodiments, a non-RAID storage controller or host adapter performs the invention. In other embodiments, a host device driver or storage application performs the invention. In other embodiments, a network switch or storage appliance performs the invention.

A storage tier is a collection of data storage elements having similar performance characteristics, as defined by the user. Performance is generally expressed in terms of MB/s for sequential workloads and IOPs for random workloads. A storage tier may contain one type of data storage, or multiple types, and a storage system would have at least one, and possibly several, storage tiers. In a practical sense, storage components and storage tiers apply to randomly accessible data storage means, including several technologies of hard disk drives and solid state disk. A storage tier may reflect a specific performance level (usually reflecting a single type of storage device), or may reflect a range of performance parameters such as above a certain IOPs number or MB/s above a certain number and below a different number. For example, a storage system may have three components: one with solid state disk (SSD), one with enterprise-class SAS drives, and one with midline/near line storage (such as less expensive SATA disk drives or low end SAS disk drives with SATA mechanical structures and a SAS interface). Among hard disk drive technologies, Enterprise class disks are generally the fastest means of storage and in one embodiment have 10K/15K RPM and fast seeks. However, solid state disks (SSDs) are today the performance leaders.

A storage component is any logically-addressable storage entity. It could be a single storage device, a RAID volume, or a separate partition on either a single storage device or multiple storage devices. Relative to the present invention, there is a plurality of components (i.e. 2 or more) within a tier.

Every component is organized into storage pages. A page is the smallest unit for newly allocated storage space, although multiple pages may need to be allocated to satisfy a write request. A page can be any size, but in a preferred embodiment is 8 MB. In a practical sense, the minimum page size is a sector size, which would be commonly 512 KB (or 4 KB in newer disk drives), and the maximum size would be perhaps 64 MB-128 MB. However, these limits are somewhat arbitrary, and reflect the amount of storage required for storage component data structures. More storage is required for data structures when smaller page sizes are used. The larger the page size, the potential for more wasted or unused space within an allocated page. Another disadvantage of large page sizes is it can be harder to decide if a large page is either "hot" or "cold" since portions of a large page may be hot while other portions may be cold. Another disadvantage of large pages is the time it takes to move a large page is greater than the time required to move a small page since large pages store more data. Each page stores multiple blocks, where blocks are disk sectors. In one embodiment, the block size is 512 bytes, and there would be 16,384 blocks in an 8 MB page. In another embodiment, the block size is 4 KB and there would be 2,048 blocks in an 8 MB page. The problem space involves selecting a page and component from the plurality of components in a storage tier to provide a source page to move to a different page and component as the destination in the plurality of components in the storage tier.

Referring now to FIG. 1a, a block diagram illustrating components of a first non host-based electronic data storage system 100 in accordance with embodiments of the present invention is shown. The electronic data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a bus such as SCSI, FC-AL, USB, Firewire, SSA, SAS, SATA, or Infiniband. In another embodiment, host bus or network 112 is a network such as Ethernet, iSCSI, Fibre Channel, SSA, ESCON, ATM, FICON or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage device bus 120 is any suitable storage bus for transferring data directly between storage controller 120 and storage devices 116, including SCSI, Fibre Channel, SAS, SATA, or SSA.

Storage subsystem 124 in one embodiment contains twelve storage devices 116. In other embodiments, storage subsystem 124 may contain fewer or more than twelve storage devices 116. Storage devices 116 include various types of devices, including hard disk drives, solid state drives, optical drives, and tape drives. Within a specific storage device type, there may be several sub-categories of storage devices, organized according to performance. For example, hard disk drives may be organized according to cache size, drive RPM (5,400, 7,200, 10,000, and 15,000, for example), queue depth, random transfer rate, or sequential transfer rate.

Figure 1B:
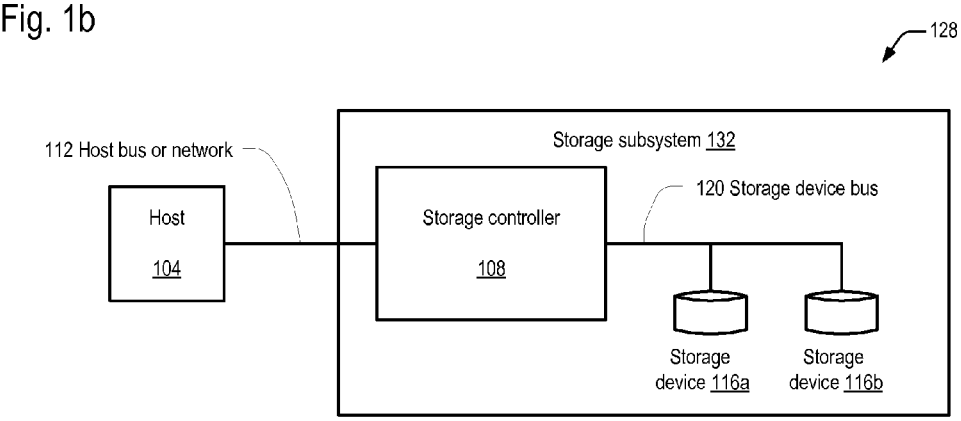
FIG. 1b is a block diagram illustrating components of a second non host-based electronic data storage system in accordance with embodiments of the present invention.

Referring now to FIG. 1b, a block diagram illustrating components of a second non host-based electronic data storage system 128 in accordance with embodiments of the present invention is shown. Non host-based electronic data storage system 128 is similar to non host-based electronic data storage system 100, with the exception being storage controller 108 is within storage system 132, along with storage devices 116. In one embodiment, storage controller 108 is a single RAID controller. In a second embodiment, storage controller 108 is a pair of redundant RAID controllers.

Figure 2A:
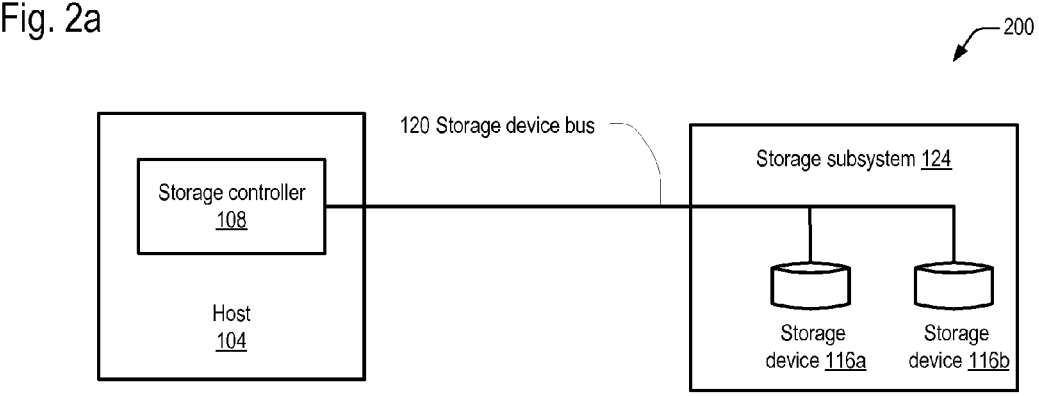
FIG. 2a is a block diagram illustrating components of a first host-based electronic data storage system in accordance with embodiments of the present invention.

Referring now to FIG. 2a, a block diagram illustrating components of a first host-based electronic data storage system 200 in accordance with embodiments of the present invention is shown. Electronic data storage system 200 is similar to data storage systems 100 and 128, except storage controller 108 is within host computer 104. Storage controller 108 interfaces through a local bus of host computer 104, where the local bus may be any suitable bus for high speed transfers between the CPU of host computer 104 and storage controller 108, including PCI, PCI-X, or PCI Express. Storage controller 108 may either be integrated on the motherboard of host computer 104, or may be an add-in board or other form of assembly in host computer 104.

Figure 2B:
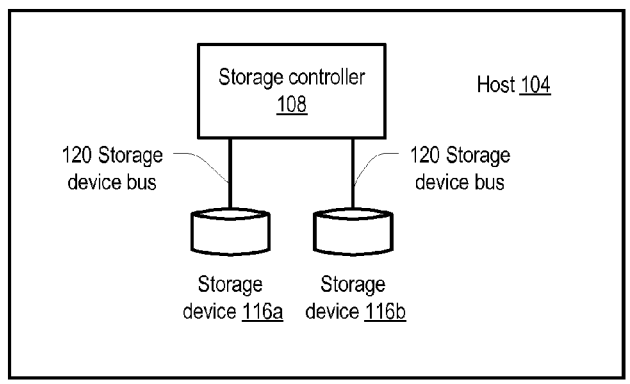
FIG. 2b is a block diagram illustrating components of a second host-based electronic data storage system in accordance with embodiments of the present invention.

Referring now to FIG. 2b, a block diagram illustrating components of a second host-based electronic data storage system 204 in accordance with embodiments of the present invention is shown. Electronic data storage system 204 is similar to data storage system 200, except storage devices 116 are within host computer 104.

Figure 2C:
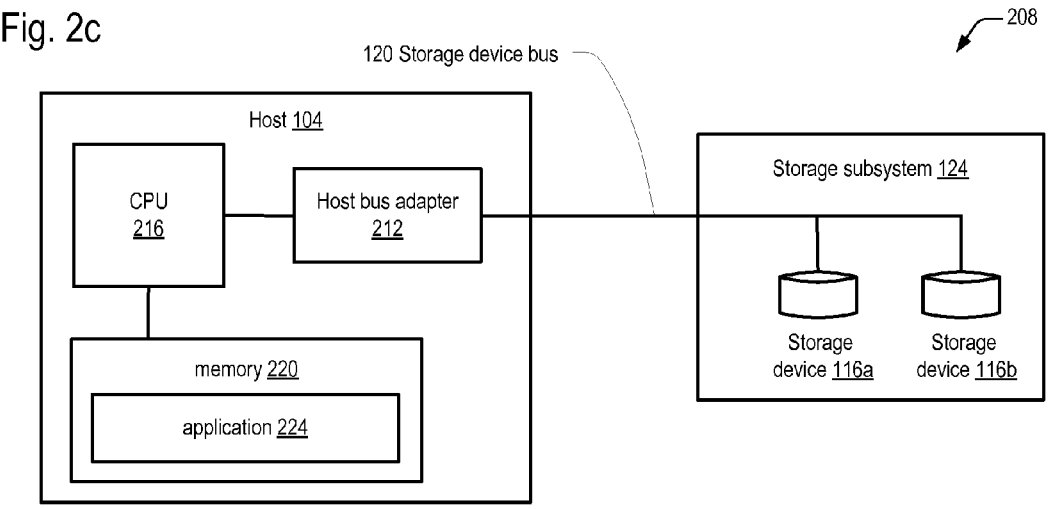
FIG. 2c is a block diagram illustrating components of a third host-based electronic data storage system in accordance with embodiments of the present invention.

Referring now to FIG. 2c, a block diagram illustrating components of a third host-based electronic data storage system 208 in accordance with embodiments of the present invention is shown. Electronic data storage system 208 is similar to data storage system 200 of FIG. 2a, with additional detail within host computer 104. Host computer 104 includes host bus adapter 212, which generates read and write requests to storage devices 116 in storage subsystem 124. Storage controller 108 in FIGS. 1a, 1b, 2a, and 2b executes the process of FIGS. 5-7. In FIG. 2c, CPU 216 executes the process of FIGS. 5-7. Application 224 in memory 220 stores the instructions that perform the steps of the present invention.

Figure 3:
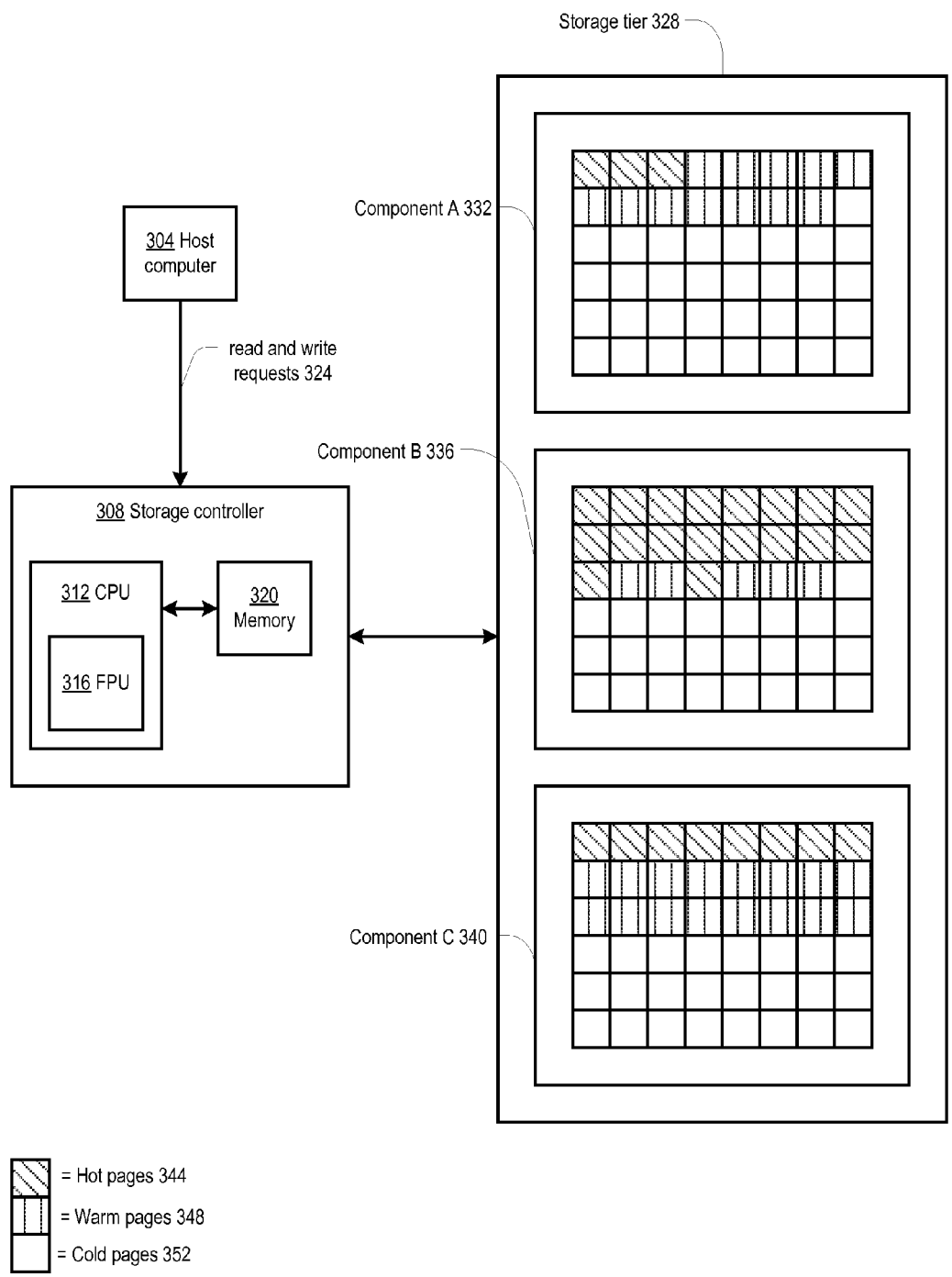
FIG. 3 is a block diagram illustrating components of an electronic data storage system including a storage tier in accordance with embodiments of the present invention.

Referring now to FIG. 3, a block diagram illustrating components of an electronic data storage system including a storage tier 328 in accordance with embodiments of the present invention is shown. Host computer 304 generates read and write requests 324 to storage controller 308. Storage controller 308 is equivalent to storage controller 108 and generates read and write requests to storage devices 116.

Figure 4C:
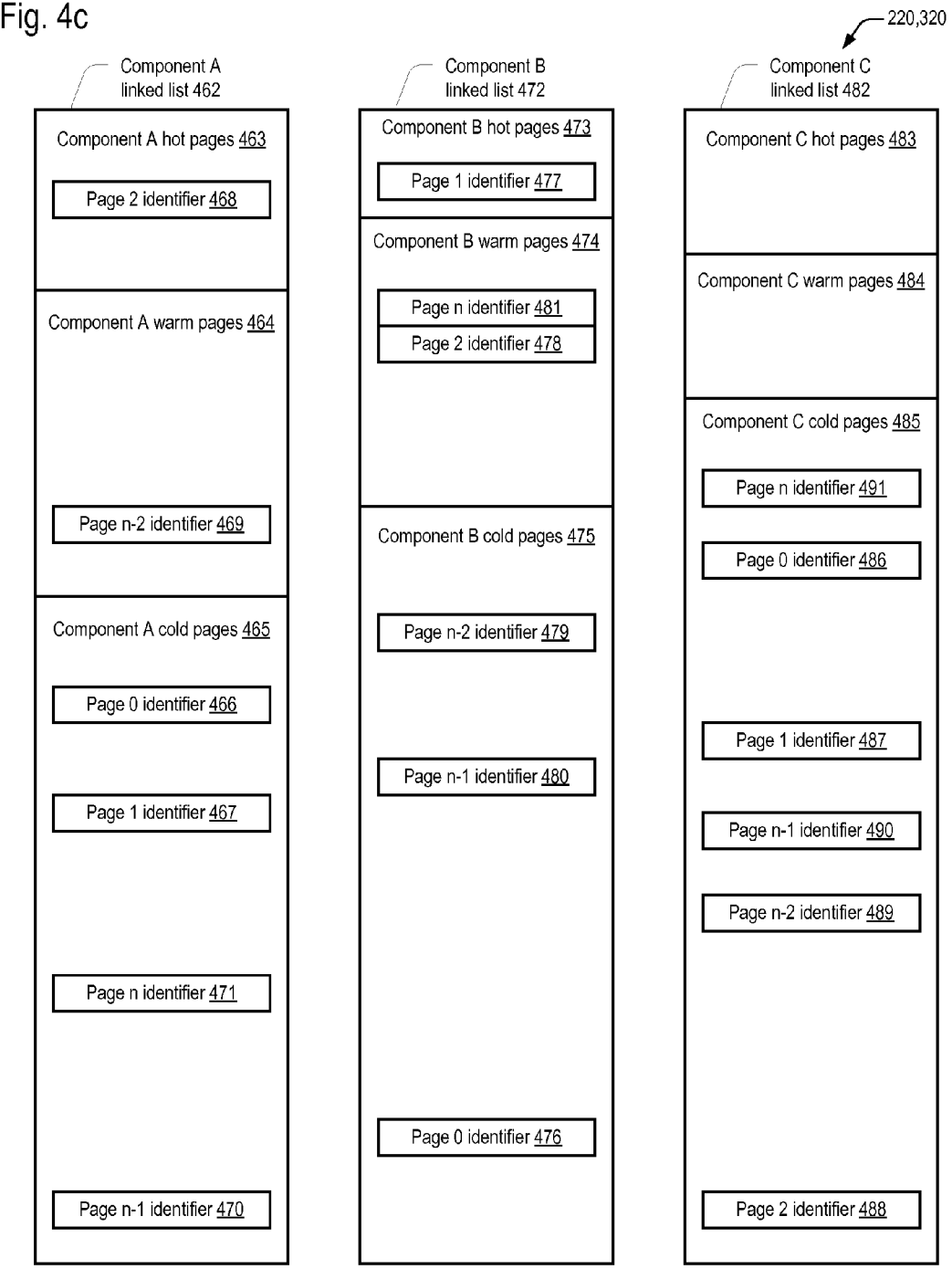
FIG. 4c is a block diagram illustrating linked lists in memory in accordance with the preferred embodiment of the present invention.

Storage controller 308 includes CPU 312, which executes the process steps of the present invention. CPU 312 is in one embodiment an X86-compatible processor such as those provided by Intel, AMD, or Via technologies. In other embodiments, CPU 312 is an embedded or mobile processor such as a processor from the ARM or PowerPC families. However, CPU may be any processor that executes stored programs. CPU 312 in a preferred embodiment includes floating point unit 316, which executes floating point arithmetic instructions. Floating point arithmetic in some applications, including calculations of the present invention, provides greater precision and computational performance over integer arithmetic. CPU 312 is coupled to memory 320. Memory 320 provides storage for computer programs that perform the process steps of FIGS. 5-9, and data structures as illustrated in FIGS. 4a-4c.

Storage devices 116 are organized into one or more storage tiers 328. Each storage tier 328 is organized into one or more storage components. In one embodiment, storage tier 328 includes three storage components: component A 332, component B 336, and component C 340. Each of component A 332, component B 336, and component C 340 is organized into storage pages. Pages are organized into multiple categories, according to frequency of usage. In a first embodiment, pages are organized into two categories: hot pages 344 and cold pages 352. Hot pages 344 are defined as above a predetermined threshold of IOs/time, and cold pages 352 are defined as below the predetermined threshold of IOs/time. An activity level equal to the predetermined threshold of IOs/time could be defined as either hot pages 344 or cold pages 352, depending on design preference. In a preferred embodiment, the predetermined hot/cold threshold of IOs/time for an LRU-2 calculation (FIG. 6, where two timestamps are stored for every page) is 5. In other words, a hot page has an LRU-2 value less than 5 and a cold page has an LRU-2 value greater than or equal to 5. This means a cold page is accessed two or less times in the past 5 seconds. In other embodiments, the predetermined threshold of IOs/time may be less than or more than 2 IOs every 5 seconds. Choice of the threshold value and unit of time is very application dependant, and may require empirical analysis to select appropriate values.

In a second embodiment, pages are organized into three categories: hot pages 344, warm pages 348, and cold pages 352. Hot pages 344 are defined as above a first predetermined threshold of IOs/time, warm pages 348 are defined as below the first predetermined threshold of IOs/time and above a second predetermined threshold of IOs/time, and cold pages 352 are defined as below the second predetermined threshold of IOs/time. An activity level equal to the first predetermined threshold of IOs/time could be defined as either hot pages 344 or warm pages 348, and an activity level equal to the second predetermined threshold of IOs/time could be defined as either warm pages 348 or cold pages 352, depending on design preference. In a preferred embodiment, the first and second predetermined threshold of IOs/time are 2 I/Os in a 5 second period of time and 2 I/Os in a 300 second (5 minute) period of time, respectively. In other embodiments, the first and second predetermined threshold of IOs/time may be less than or more than 2 I/Os every 5 seconds and 2 IOs every 5 minutes, respectively. Choice of the threshold value and unit of time is very application dependant, and may require empirical analysis to select appropriate values. However, hot pages preferably have LRU-2 values between 0 and 60 seconds (1 minute), warm pages have LRU-2 values between 5 seconds and 3600 seconds (1 hour), and cold pages have LRU-2 values between 300 seconds (5 minutes) and 3600 seconds (1 hour).

It is generally advantageous to choose a low number of predetermined thresholds of IOs/time in order to reduce data structure storage requirements and computations. Empirical observation has shown there to be a diminishing returns value in the number of predetermined thresholds maintained. Therefore, not more than two predetermined thresholds (for hot pages 344, warm pages 348, and cold pages 352) are recommended.

Referring now to FIG. 4a, a top-level block diagram illustrating data structures in memory 220, 320 in accordance with the preferred embodiment of the present invention is shown. FIG. 4 assumes the three components shown in FIG. 3 are used: Component A 332, Component B 336, and Component C 340.

For each of Component A 332, Component B 336, and Component C 340, at several data structures are required: I/O counters and time stamps 402, 422, and 442, hot page count 401, 494, 497, warm page count 492, 495, 498, cold page count 493, 496, 499, and linked list 462, 472, and 482. In a preferred embodiment, I/O counters and time stamps are combined in the same data structure 402, 422, 442. In other embodiments, I/O counters and time stamps are in different data structures.

One I/O counter is required per page within a storage component 332, 336, 340. Therefore, if each storage component has n pages, each storage component has n I/O counters. In a preferred embodiment, each I/O counter is a 64-bit value. 64-bit values can allow years of operation before the counter overflows. However, I/O counters may have fewer or more than 64-bits.

Each page within a storage component 332, 336, 340 requires a minimum of one time stamp. Although there is no theoretical maximum number of time stamps per page, the actual number used is low (1-3, generally) in order to reduce memory 220, 320 storage requirements. However, more time stamps per page allows more historical data to be stored, which in turn allows more accurate page rank decisions to be made. In a preferred embodiment, time stamps have 1 second granularity. In other embodiments, time stamps have less than or more than 1 second granularity. However, time stamp granularity is preferably not less than 10 milliseconds (ms), or more than 10 seconds. In a preferred embodiment, time stamps are preferably 32-bit values, although in other embodiments time stamps may have fewer or more than 32 bits. 32 bits per time stamp allows over 100 years of runtime, without overflowing.

Each of components 332, 336, 340 also has an associated linked list 462, 472, 482, respectively. Component A linked list 462, component B linked list 472, and component C linked list 482 each have a number of entries n equal to the number of pages in each component 332, 336, 340. Each entry in the linked list 462, 472, 482 uniquely identifies one page, and the process of the present invention reorders each linked list 462, 472, 482, according to I/O activity levels directed to each page.

Referring now to FIG. 4b, a detailed block diagram illustrating I/O counters and time stamps in accordance with the preferred embodiment of the present invention is shown. Each of component A 332, component B 336, and component C 340 has n pages and two time stamps per page.

For component A 332, component A I/O counters and time stamps 402 are provided. Component A I/O counters and time stamps 402 includes I/O counters 403-408 and time stamps 409-420. For component B 336, component B I/O counters and time stamps 422 are provided. Component B I/O counters and time stamps 422 includes I/O counters 423-428 and time stamps 429-440. For component C 340, component C I/O counters and time stamps 442 are provided. Component C I/O counters and time stamps 442 includes I/O counters 443-448 and time stamps 449-460.

Referring now to FIG. 4c, a block diagram illustrating linked lists 462, 472, 482 in memory 220, 320 in accordance with the preferred embodiment of the present invention is shown. Each component 332, 336, 340 also has a linked list stored in memory 220, 320: component A linked list 462, component B linked list 472, and component C linked list 482. FIG. 4c illustrates an exemplary set of linked lists 462, 472, 482, during or after adjustment by the processes of FIGS. 5-9. The adjustments are shown in order to understand the effects of page reordering, and may be very different in practice from what is shown.

Component A linked list 462 includes a page 0 identifier 466, a page 1 identifier 467, a page 2 identifier 468 through a page n−2 identifier 469, a page n−1 identifier 470, and a page n identifier 471. Component A linked list 462 includes component A hot pages 463, component A warm pages 464, and component A cold pages 465. Although there are typically more cold pages than warm pages, and more warm pages than hot pages, in practice this may not be the case.

Component B linked list 472 contains a page 0 identifier 476, a page 1 identifier 477, a page 2 identifier 478 through a page n−2 identifier 479, a page n−1 identifier 480, and a page n identifier 481. Component B linked list 472 includes component B hot pages 473, component B warm pages 474, and component B cold pages 475.

Component C linked list 482 contains a page 0 identifier 486, a page 1 identifier 487, a page 2 identifier 488 through a page n−2 identifier 489, a page n−1 identifier 490, and a page n identifier 491. Component C linked list 482 includes component C hot pages 483, component C warm pages 484, and component C cold pages 485.

The present invention reorders each of the linked lists 462, 472, 482 based on changes in component A I/O counters 403-408, component A time stamps 409-420, component B I/O counters 423-428, component B time stamps 429-440, component C I/O counters 443-448, and component C time stamps 449-460. In the example of FIG. 4c, some page identifiers illustrated in component A linked list 462, component B linked list 472, and component C linked list 482 have been reordered.

In component A linked list 462, page 2 identifier 468 has migrated "up" the linked list 462 since the I/O activity level designated by Component A Page 2 I/O counter 405 and time stamps 413, 414 allows Component A page 2 to be classified as a component A hot page 463. Page n−2 has been classified as a component A warm page 464 since Page n−2 identifier 469 is within the component A warm range. Pages 0, 1, n, and n−1 have been classified as a component A cold pages 465 since the Page 0 identifier 466, the Page 1 identifier 467, the Page n identifier 471, and the Page n−1 identifier 470 are within the component A cold range.

In component B linked list 472, page 1 identifier 477 has migrated "up" the linked list 472 since the I/O activity level designated by Component B Page 1 I/O counter 424 and time stamps 431, 432 allows Component B page 1 to be classified as a component B hot page 473. Pages n and 2 have been classified as component B warm page 474 since Page n identifier 481 and Page 2 identifier 478 are within the component B warm range. Pages n−2, n−1, and 0 have been classified as a component B cold pages 475 since the Page n−2 identifier 479, the Page n−1 identifier 480, and the Page 0 identifier 476 are within the component B cold range.

In component C linked list 482, no page identifiers have migrated to either the component C hot pages 483 or warm pages 484. Pages n, 0, 1, n−1, n−2, and 2 have been classified as a component C cold pages 485 since the Page n identifier 491, the Page 0 identifier 486, the Page 1 identifier 487, the Page n−1 identifier 490, the Page n−2 identifier 489, and the Page 2 identifier 488 are within the component C cold range.

The number of hot, warm, or cold pages may be different for each component within the storage tier 328. In the example of FIG. 4c, component A 332 has the most hot pages 463, followed by component C 340 and component B 336. Components A 332 and B 336 have the same number of warm pages 464 and 474, respectively, followed by component C 340. Component C 340 has the greatest number of cold pages 485, followed by component B 475 and component A 465.

Referring now to FIG. 5a, a flowchart illustrating a method for generating a loose linked list 462, 472, 482 per storage component 332, 336, 340 in accordance with a first embodiment of the present invention is shown. Flow begins at block 504.

At block 504, the storage controller 308 generates an I/O to a current page. The current page is addressed by the I/O, and is within one of the storage components 332, 336, 340 within the storage tier 328. Flow proceeds to block 508.

At block 508, the storage controller 308 calculates the page rank for the current page and the previous page. The current page is the page the I/O request of block 504 is addressed to, and the previous page in one embodiment is the sequentially adjacent page to the current page with a lower logical block address (LBA) than the current page. The previous page in a second embodiment is the sequentially adjacent page to the current page with a higher logical block address (LBA) than the current page. Page rank calculation is shown in FIG. 6. Flow proceeds to block 512.

At block 512, the storage controller 308 compares the rank of the current page to the rank of the previous page. Flow proceeds to decision block 516.

At decision block 516, the storage counter 308 determines if the rank of the current page rank is greater than the rank of the previous page. If the rank of the current page is greater than the rank of the previous page, then flow proceeds to block 520. If the rank of the current page is not greater than the rank of the previous page, then flow proceeds to block 524.

At block 520, the storage controller 308 exchanges the identifier for the current page with the identifier for the previous page in the linked list. The page identifier exchange migrates the current page incrementally toward the "hot" end of the linked list. Flow proceeds to block 524.

At block 524, the storage controller 308 returns the linked list 462, 472, or 482 to memory 220, 320, where the process of FIGS. 6-9 examines the linked list 462, 472, or 482. Flow ends at block 524.

Referring now to FIG. 5b, a flowchart illustrating a method for generating a loose linked list 462, 472, 482 per storage component 332, 336, 340 in accordance with a second embodiment of the present invention is shown. Flow begins at block 504.

At block 504, the storage controller 308 generates an I/O to a current page. The current page is addressed by the I/O, and is within one of the storage components 332, 336, 340 within the storage tier 328. Flow proceeds to block 528.

At block 528, the storage controller 308 calculates the page rank for the current page, the previous page, and the next page. The current page is the page the I/O request of block 504 is addressed to. In one embodiment, the previous page is the sequentially adjacent page to the current page with a lower logical block address (LBA) than the current page and the next page is the sequentially adjacent page to the current page with a higher logical block address (LBA) than the current page. In a second embodiment, the previous page is the sequentially adjacent page to the current page with a higher logical block address (LBA) than the current page and the next page is the sequentially adjacent page to the current page with a lower logical block address (LBA) than the current page. In either case, the definitions for "previous page" and "next page" apply prior to any page identifier exchange operations. Page rank calculation is shown in FIG. 6. Flow proceeds to block 512.

At block 512, the storage controller 308 compares the rank of the current page to the rank of the previous page. Flow proceeds to decision block 516.

At decision block 516, the storage counter 308 determines if the rank of the current page rank is greater than the rank of the previous page. If the rank of the current page is greater than the rank of the previous page, then flow proceeds to block 520. If the rank of the current page is not greater than the rank of the previous page, then flow proceeds to block 532.

At block 520, the storage controller 308 exchanges the identifier for the current page with the identifier for the previous page in the linked list. The page identifier exchange migrates the current page incrementally toward the "hot" end of the linked list. Flow proceeds to block 524.

At block 524, the storage controller 308 returns the linked list 462, 472, or 482 to memory 220, 320, where the process of FIGS. 6-9 examines the linked list 462, 472, 482. Flow ends at block 524.

At block 532, the storage controller 308 compares the rank of the current page to the rank of the next page. Flow proceeds to decision block 536.

At decision block 536, the storage controller 308 determines if the rank of the current page is less than the rank of the next page. If the rank of the current page is less than the rank of the next page, then flow proceeds to block 540. If the rank of the current page is not less than the rank of the next page, then flow proceeds to block 524.

At block 540, the storage controller 308 exchanges the identifier for the current page with the identifier for the next page in the linked list. The page identifier exchange migrates the current page toward the "cold" end of the linked list. Flow proceeds to block 524.

Referring now to FIG. 6, a flowchart illustrating a method for calculating page rank 508, 528 in accordance with the preferred embodiment of the present invention is shown. Flow begins at block 604.

At block 604, the storage controller 308 copies all time stamps to the next older time stamp, for the page. Therefore, for a data structure including three time stamps for each page, where T1 is the most recent and T3 is the oldest, block 604 copies time stamp T2 to T3 and T1 to T2. Flow proceeds to block 608.

At block 608, the storage controller 308 stores the current time to the most recent time stamp for the page. Therefore, where T1 is the most recent time stamp, block 608 copies the current time to T1. Flow proceeds to block 612.

At block 612, the storage controller 308 increments the I/O counter for the page. This step maintains a running count of all I/O's issued to the current page. Flow proceeds to block 616.

At block 616, the storage controller 308 calculates the LRU-N value for the current page by subtracting the oldest timestamp from the current time. Where T3 is the oldest time stamp, the LRU-N value for the current page is the current time minus T3. Flow proceeds to block 620.

At block 620, the storage controller 308 calculates the MRU-N value for the page by subtracting the LRU-N value calculated in block 616 from a first predetermined value. The first predetermined value does not need to be any specific number, but on scale it is approximately 0x80000000 (hexadecimal) or about 2 billion (decimal). In a preferred embodiment, page rank is a 32-bit unsigned number. 0x80000000 (hexadecimal) is approximately half of the maximum possible value using a 32-bit unsigned number. Flow proceeds to block 624.

At block 624, the storage controller 308 calculates page rank for the page by adding the MRU-N value calculated in block 620 to the I/O counter value for the page. Page rank is calculated each time a new I/O request is addressed to a page, and is used to perform the loose ordering of pages in the linked list belonging to each component. It is possible that I/O counters may overflow at some point. One solution is to use 64-bit counters for each page, which reduces the likelihood the counters will roll over in less than hundreds of years. Another solution is to periodically reset all I/O counters on a weekly or monthly basis. Yet another solution is to limit the I/O counters such that once they reach the maximum value (i.e. 0xFFFFFFFF for a 32-bit counters), they remain at that value either indefinitely or until reset weekly or monthly.

The preferred embodiment of FIG. 6 calculates page rank by combining I/O count with MRU-N values. Large LRU-N values contribute to a low page rank, and large I/O counts contribute to a high page rank. MRU-N is maximized as a contributor to page rank when LRU-N is zero. A slight alternative to the preferred embodiment is to calculate page rank is equal to I/O count minus LRU-N, where page rank is a signed number. If I/O count is zero, then page rank can be a negative number. Another alternative is to use a large number that corresponds to the MRU-N value when LRU-N is zero. The large number would therefore be the maximum value of MRU-N. In that case, a non-linear function of the maximum value of MRU-N divided by LRU-N can be used. However, to avoid divide by zero problems, a small nonzero number must be used for LRU-N when LRU-N is actually zero. This function gives small LRU-N values a correspondingly large contribution, but a rapidly decreasing contribution as LRU-N increases.

Figure 7:
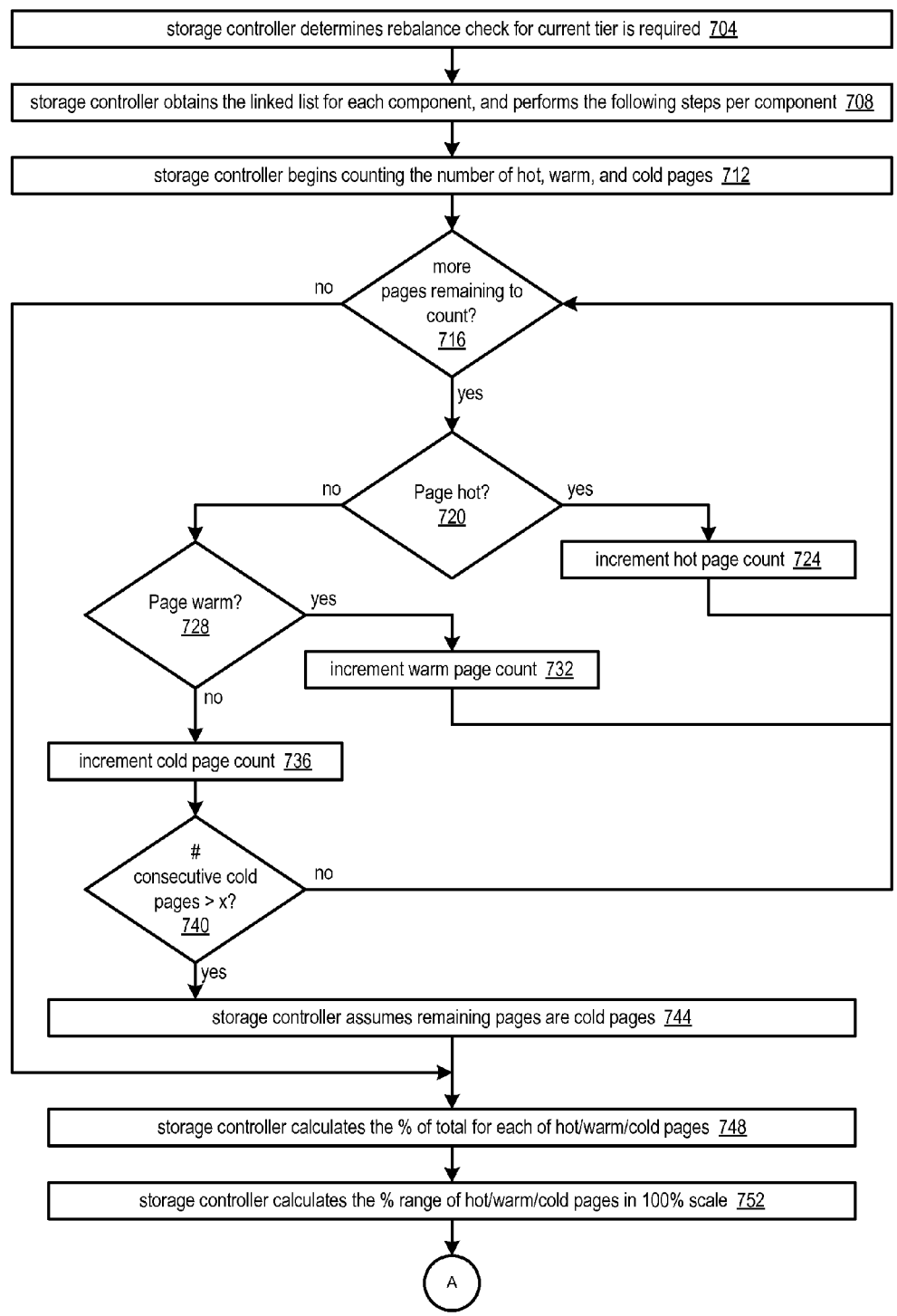
FIG. 7 is a flowchart illustrating a method for calculating percentage ranges for hot, warm, and cold pages in accordance with the preferred embodiment of the present invention.

Referring now to FIG. 7, a flowchart illustrating a method for calculating percentage ranges for hot, warm, and cold pages in accordance with the preferred embodiment of the present invention is shown. Flow begins at block 704.

At block 704, the storage controller 308 determines a rebalance check for the current storage tier 328 is required. In one embodiment, a rebalance check may be required upon power-on of the storage tier 328. In a second embodiment, a rebalance check may be required after a new storage component 332, 336, 340 is added to the storage tier 328. In a third embodiment, a user or system administrator may command a rebalance check. In a fourth embodiment, a timer timing out may command a rebalance check. In a fifth embodiment, a master I/O counter counts all I/O requests to a storage component 332, 336, 340 or storage tier 328. When the master I/O counter reaches a predetermined value, a rebalance check is initiated and the master I/O counter is reset. Flow proceeds to block 708.

At block 708, the storage controller 308 obtains the linked list 462, 472, 482 for each component 332, 336, 340. The linked list 462, 472, 482 for each component 332, 336, 340 is stored in memory 220, 320 of storage controller 308. Flow proceeds to block 712.

At block 712, the storage controller 308 counts the number of hot pages 344, warm pages 348 (if used), and cold pages 352 in each linked list 462, 472, 482. Flow proceeds to decision block 716.

At decision block 716, the storage controller 308 determines if more pages are remaining to be counted. If more pages are remaining to be counted, then flow proceeds to decision block 720. If more pages are not remaining to be counted, then flow proceeds to block 748.

At decision block 720, the storage controller 308 determines if the page being counted is a hot page 344. If the page being counted is a hot page 344, then flow proceeds to block 724. If the page being counted is not a hot page 344, then flow proceeds to decision block 728.

At block 724, the storage controller 308 increments the hot page count 401, 494, 497 for the component 332 336, 340 containing the page. Flow proceeds to decision block 716 to determine if more pages remain to be counted.

At decision block 728, the storage controller 308 determines if the page being counted is a warm page 348. If the page being counted is a warm page 348, then flow proceeds to block 732. If the page being counted is not a warm page 348, then flow proceeds to block 736.

At block 732, the storage controller 308 increments the warm page count 492, 495, 498 for the component 332 336, 340 containing the page. Flow proceeds to decision block 716 to determine if more pages remain to be counted.

At block 736, the storage controller 308 increments the cold page count 493, 496, 499 for the component 332 336, 340 containing the page. Flow proceeds to decision block 740.

At decision block 740, the storage controller 308 determines if the number of consecutive cold pages 352 is greater than a predetermined value. If the number of consecutive cold pages 352 is greater than the predetermined value, then flow proceeds to block 744. If the number of consecutive cold pages 352 is not greater than the predetermined value, then flow proceeds to decision block 716 to determine if more pages remain to be counted.

At block 744, the storage controller 308 assumes the rest of the uncounted pages in the storage component 332, 336, 340 are cold pages 352. The storage controller 308 sets the cold page count 493, 496, 499 for the component 332 336, 340 containing the page to be the sum of the counted cold pages 352 and the remaining pages in the component 332, 336, 340. At this point, the storage controller has completed counting the hot pages 344, warm pages 348, and cold pages 352 in the component 332, 336, 340. Decision block 740 and block 744 represent a time-saving optimization of the page counting process, since many more cold pages 352 are expected than hot pages 344 or warm pages 348. When a consecutive string of cold pages 352 are counted by the storage controller, it is likely that the remaining uncounted pages are cold pages—or at least a significant majority are cold pages 352. Without the counting optimization represented by decision block 740 and block 744, blocks 740/744 would be eliminated, and block 736 would proceed to decision block 716. Flow proceeds to block 748.

At block 748, the storage controller 308 calculates the percent of total for each of hot pages 344, warm pages 348, and cold pages 352. The sum of hot pages 344, warm pages 348, and cold pages 352 is the total number of pages in the storage component 332, 336, 340. Therefore, the percentage of hot pages 344 is the number of counted hot pages 344 divided by the total number of pages in the component 332, 336, 340, the percentage of warm pages 348 is the number of counted warm pages 348 divided by the total number of pages in the component 332, 336, 340, and percentage of cold pages 352 is the number of counted cold pages 352 divided by the total number of pages in the component 332, 336, 340. Flow proceeds to block 752.

At block 752, the storage controller 308 calculates the percent range of hot pages 344, warm pages 348, and cold pages 352 in a one hundred percent scale. For example, assuming there is 10% hot pages 344, 25% warm pages 348, and 65% cold pages 352, hot pages 344 are 90-100%, warm pages 348 are 65-90%, and cold pages 352 are 0-65%. Flow proceeds to block 804 of FIG. 8.

Figure 8:
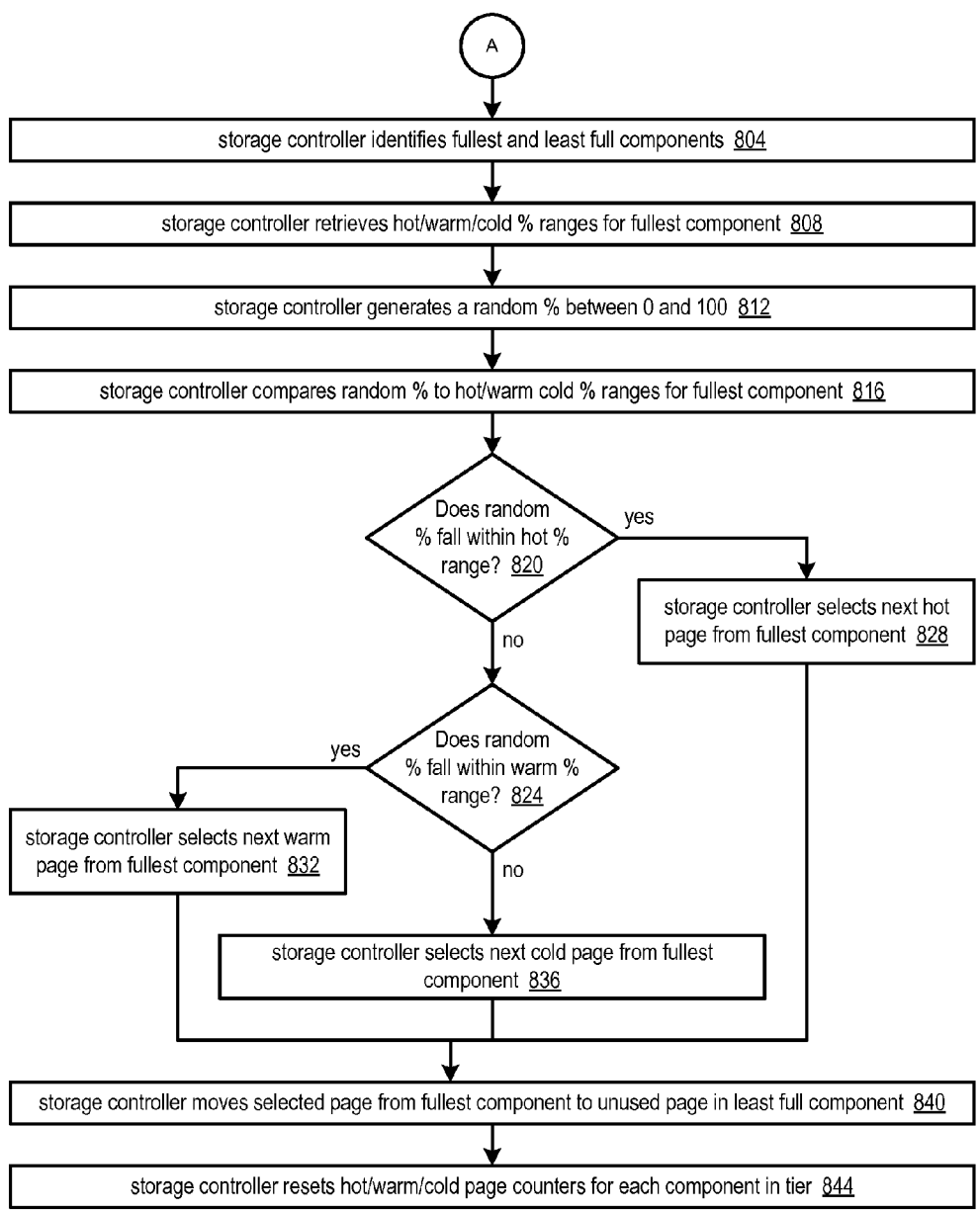
FIG. 8 is a flowchart illustrating a method for reordering pages between storage components in accordance with the preferred embodiment of the present invention.

Referring now to FIG. 8, a flowchart illustrating a method for reordering pages between storage components 332, 336, 340 in accordance with the preferred embodiment of the present invention is shown. Flow begins at block 804.

At block 804, the storage controller 308 identifies the fullest and least full components 332, 336, 340. The fullest component 332, 336, 340 is the component 332, 3367, 340 with the most in-use pages. In-use pages are pages that have previously been written to. The least full component 332, 336, 340 is the component with the fewest in-use pages. Flow proceeds to block 808.

At block 808, the storage controller 308 retrieves the hot/warm/cold percent ranges for the fullest component 332, 336, 340. The hot/warm/cold percent ranges were calculated for each component 332, 336, 340 in block 752 of FIG. 7. Flow proceeds to block 812.

At block 812, the storage controller 308 generates a random percent between 0 and 100%. Flow proceeds to block 816.

At block 816, the storage controller 308 compares the random percent generated in block 812 to the hot/warm/cold percentage ranges for the fullest component 332, 336, 340 calculated in block 752 of FIG. 7. Flow proceeds to decision block 820.

At decision block 820, the storage controller 308 determines if the random percentage falls within the hot percentage range. If the random percentage does fall within the hot percentage range, then flow proceeds to block 828. If the random percentage does not fall within the hot percentage range, then flow proceeds to decision block 824.

At decision block 824, the storage controller 308 determines if the random percentage falls within the warm percent range. If the random percentage does fall within the warm percentage range, then flow proceeds to block 832. If the random percentage does not fall within the hot percentage range, then flow proceeds to block 836.

At block 828, the storage controller 308 selects the next hot page 344 from the fullest component. Flow proceeds to block 840.

At block 832, the storage controller 308 selects the next warm page 348 from the fullest component. Flow proceeds to block 840.

At block 836, the storage controller 308 selects the next cold page 352 from the fullest component. It can be seen from the process steps of FIG. 8 that the most likely pages selected for rebalancing will have the hot/warm/cold characteristics of the greatest percentages. Therefore, if warm pages 348 of a given component 332, 336, 340 have a greater percentage of total pages in the component 332, 336, 340 than either hot pages 344 or cold pages 352, it is most likely that a warm page 348 will be selected for rebalancing—until such time as the number of hot 344 or cold 352 pages have the greater percentage. Flow proceeds to block 840.

At block 840, the storage controller 308 moves the selected page from one of blocks 828, 832, and 836 in the fullest component 332, 336, 340 with the next empty page in the least full component 332, 336, 340. The next empty page in the least full component 332, 336, 340 is the next cold page in the least full component with a zero I/O counter value. Flow proceeds to block 844.

At block 844, the storage controller 308 resets the hot page counters 401,494, 497, warm page counters 492, 495, 498, and cold page counters 493, 496, 499 for each component 332, 336, 340 in the storage tier 328. Flow ends at block 844.

Figure 9:
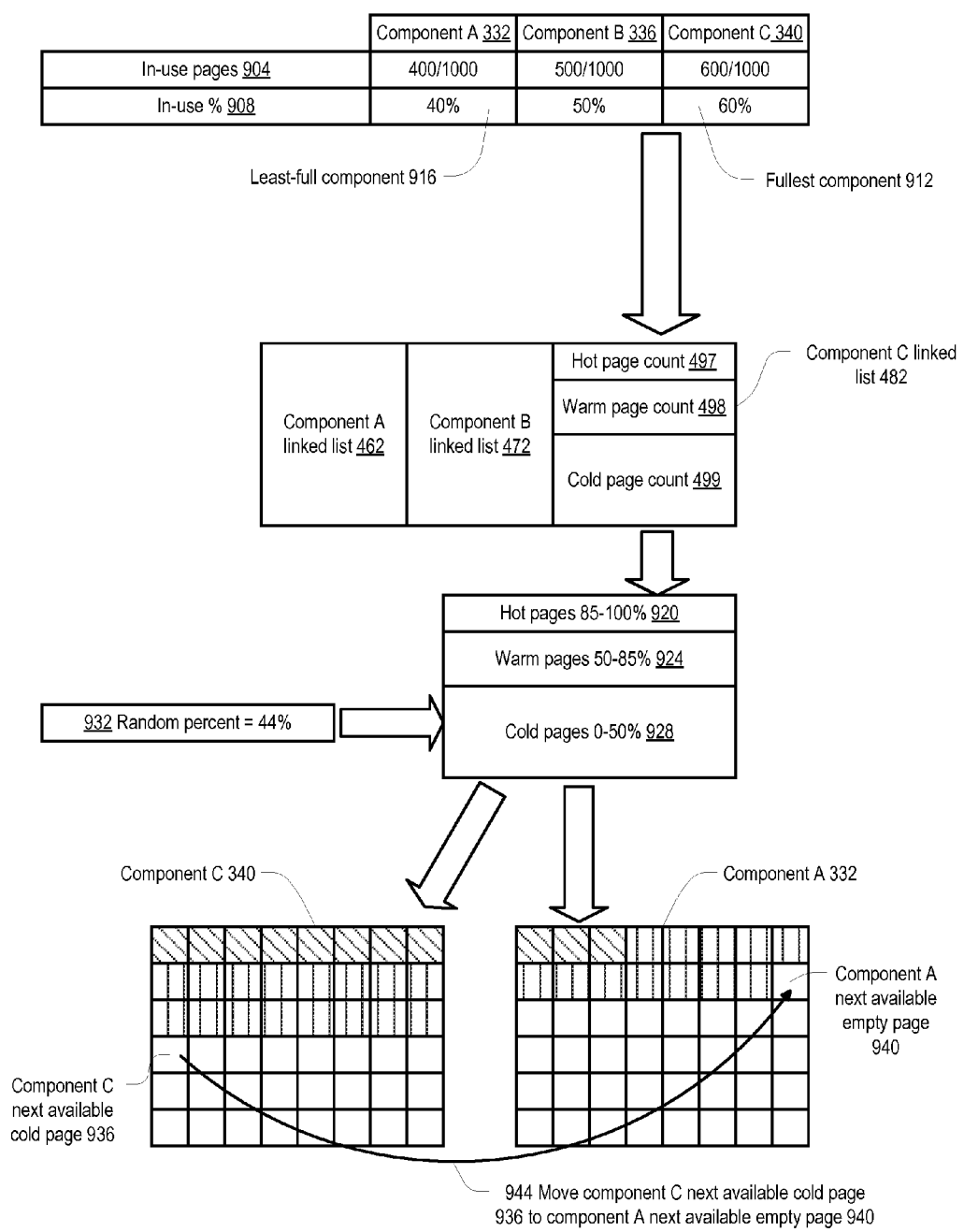
FIG. 9 is a block diagram illustrating exemplary page rebalancing in accordance with the preferred embodiment of the present invention.

Referring now to FIG. 9, a block diagram illustrating exemplary page rebalancing in accordance with the preferred embodiment of the present invention is shown. The example of FIG. 9 utilizes component A 332, component B 336, and component C 340 of FIG. 3.

Component A 332 has 1000 total pages, and 400 in-use pages 904 of the 1000 total pages. Therefore, component A 332 has an in-use percent 908 of 400/1000 or 40%. Component B 336 has 1000 total pages, and 500 in-use pages 904 of the 1000 total pages. Therefore, component B 336 has an in-use percent 908 of 500/1000 or 50%. Similarly, component C 340 has 1000 total pages, and 600 in-use pages 904 of the 1000 total pages. Therefore, component C 340 has an in-use percent 908 of 600/1000 or 60%. Since component C 340 has the highest in-use percent 908 (60%), Component C 340 is the fullest component 912. Since component A 332 has the lowest in-use percent 908 (40%), component A 332 is the least full component 916.

The process next retrieves the linked list for component C 482, since component C is the fullest component 912. The process counts hot pages 497 and warm pages 498 for component C 340. Warm pages 498 are counted only if the process supports three activity groups (i.e. hot/warm/cold pages) and two thresholds (i.e. the threshold from warm pages to hot pages and the threshold from cold pages to warm pages). The process also counts cold pages 499, and may possibly but not necessarily include the improvement shown in blocks 740-744 of FIG. 7. The process determines there are 150 hot pages 483, 250 warm pages 484, and 500 cold pages 485.

Once the hot page count 497, warm page count 498, and cold page count 499 is known, the process next determines a percent range for each page type. In the illustrated embodiment, the hot page percent range 920 is at the upper end of the percent range, and the cold percent range 928 is at the bottom end of the percent range. In another embodiment, the cold page percent range 928 is at the upper end of the percent range, and the hot percent range 920 is at the bottom end of the percent range. Since there are 150 hot pages 497, the hot percent range 920 is from 85-100%. Since there are 250 warm pages 498, the warm percent range 924 is from 50-85%. Since there are 500 cold pages 499, the cold percent range 928 is from 0-50%.

The process next generates a random percentage 932, which in the example is 44%. Since 44% falls within the cold percent range 0-50% 928, a cold page in the fullest component 912 is selected as the source page for rebalance. The process selects the next available cold page 936 in component C 340, and the next available empty page 940 in the least full component 916 (component A 332). Finally, the process moves 944 the next available cold page 936 in component C 340 to the next available empty page 940 in component A 332. The next available empty page 940 is the first cold page found where the I/O counter is zero. This completes one page rebalance operation.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A method for a storage controller to rebalance a plurality of storage components within a storage tier, comprising:
    maintaining a linked list for each component in the plurality of storage components in the storage tier, wherein each component comprises a plurality of pages, wherein the linked list for each component comprises a plurality of identifiers corresponding to the plurality of pages, wherein the linked list is ordered according to hot and cold pages;
    calculating a percent range of hot pages and cold pages in the linked list for each component in the plurality of storage components;
    identifying a fullest component and a least full component within the plurality of storage components;
    generating a random percent between zero percent and one hundred percent;
    comparing the random percent to the hot percent range and the cold percent range for the fullest component;
        if the random percent falls within the hot percent range, selecting a hot page from the fullest component and moving the selected hot page in the fullest component to an empty page in the least full component; and
        if the random percent falls within the cold percent range, selecting a cold page from the fullest component and moving the selected cold page in the fullest component to an empty page in the least full component.

2. The method of claim 1, wherein the storage controller rebalances the plurality of storage components during at least one of a repeating predetermined time interval, when commanded by a user or system administrator, when a new storage component is added to the storage tier, and when an I/O request threshold to a storage component in the storage tier is met.

3. The method of claim 1, wherein maintaining the linked list for each component in the plurality of storage components in the storage tier comprises:
    in response to receiving a read or write request, generating an I/O request to a current page by the storage controller, wherein the current page corresponds to a logical block address (LBA) specified by the read or write request;
    calculating a page rank for the current page and a previous page, wherein the current page is designated by a current page identifier in the linked list, wherein the previous page is designated by a previous page identifier in the linked list, wherein the previous page identifier is sequentially adjacent to the current page identifier and corresponds to a lower logical block address than the current page identifier;
        if the page rank for the current page is greater than the page rank for the previous page, exchanging the current page identifier with the previous page identifier in the linked list; and
        if the page rank for the current page is not greater than the page rank for the previous page, forgoing exchanging the current page identifier with the previous page identifier in the linked list.

4. The method of claim 3, further comprising:
    calculating a page rank for a next page, wherein the next page is designated by a next page identifier in the linked list, wherein the next page identifier is sequentially adjacent to the current page identifier and corresponds to a higher logical block address than the current page identifier;
        if the page rank for the current page is not greater than the page rank for the previous page, and the page rank for the current page is less than the page rank for the next page, exchanging the current page identifier with the next page identifier in the linked list; and
        if the page rank for the current page is not greater than the page rank for the previous page, and the page rank for the current page is not less than the page rank for the next page, forgoing exchanging the current page identifier with the next page identifier in the linked list.

5. The method of claim 4, wherein each page is associated with an I/O counter and one or more time stamps, wherein one or more time stamps store the historical time that an I/O request was issued to the page, wherein calculating page rank comprises:
    copying each time stamp for the page to the next older timestamp for the page, if more than one time stamp is associated with the page;
    storing the current time to the most recent time stamp for the page;
    incrementing the I/O counter for the page, wherein the I/O counter stores the number of I/O requests to the page by the storage controller;
    subtracting the oldest time stamp for the page from the current time to determine an LRU-N value for the page;
    subtracting the LRU-N value for the page from a predetermined number to determine an MRU-N value for the page; and
    adding the MRU-N value for the page to the I/O counter value for the page.

6. The method of claim 5, further comprising:
    resetting a plurality of I/O counters for all pages in the storage component, after moving the page in the fullest component to the page in the least full component.

7. The method of claim 5, further comprising:
    resetting a plurality of I/O counters for all pages in the storage component, after an I/O counter of a plurality of I/O counters for the component in the plurality of storage components comprising the current page overflows.

8. The method of claim 5, further comprising:
    resetting a plurality of I/O counters for the component in the plurality of storage components comprising the current page, after an I/O counter in the plurality of storage components comprising the current page reaches a predetermined value.

9. The method of claim 1, wherein the fullest component within the plurality of storage components is the component having the highest percent range of hot pages, wherein the least full component within the plurality of storage components is the component having the lowest percent range of hot pages.

10. The method of claim 1, wherein calculating the percent range of hot pages and cold pages in the linked list for each component in the plurality of storage components comprises:
    determining a number of hot pages and a number of cold pages in the linked list, wherein hot pages have more than a first predetermined threshold of IOs per time period, wherein cold pages have less than a second predetermined threshold of IOs per time period;

calculating a percent hot and a percent cold for the storage component, wherein the percent hot is the number of hot pages divided by the total number of pages in the storage component, and the percent cold is the number of cold pages divided by the total number of pages in the storage component; and calculating a numeric range within a one hundred percent scale for the hot pages and the cold pages, wherein the numeric range for the hot pages is the percent range of hot pages in the linked list and the numeric range for the cold pages is the percent range of cold pages in the linked list.

11. The method of claim 10, wherein the first predetermined threshold of IOs per time period is greater than the second predetermined threshold of IOs per time period.

12. The method of claim 10, wherein the first predetermined threshold of IOs per time period is equal to the second predetermined threshold of IOs per time period.

13. A storage controller for rebalancing a plurality of storage components within a storage tier, comprising:
 a memory comprising:
  a linked list for each of the plurality of storage components, the linked list comprising:
   a plurality of identifiers for hot pages and cold pages, wherein the linked list is ordered according to the hot and cold pages;
  an I/O counter, wherein the I/O counter stores a number of I/O requests to the page by the storage controller; and
  one or more time stamps, wherein one or more time stamps store the historical time that an I/O request was issued to the page;
 an interface to the storage tier, the storage tier comprising the plurality of storage components, each of the plurality of storage components comprising a plurality of pages; and
 a processor, coupled to the memory and the interface, wherein for each storage component in the plurality of storage components the processor:
  maintains the linked list;
  calculates a percent range of hot pages and cold pages in the linked list;
  identifies a fullest component and a least full component;
  generates a random percent between zero percent and one hundred percent;
  compares the random percent to the hot percent range to the cold percent range for the fullest component;
   if the random percent falls within the hot percent range, the processor selects a hot page from the fullest component and moves the selected hot page in the fullest component to an empty page in the least full component; and
   if the random percent falls within the cold percent range, the processor selects a cold page from the fullest component and moves the selected cold page in the fullest component to an empty page in the least full component.

14. The storage controller of claim 13, wherein the storage controller rebalances the plurality of storage components at one of predetermined time intervals, when commanded by a user or system administrator, when an I/O request threshold to a storage component in the storage tier is met, and when a new storage component is added to the storage tier.

15. The storage controller of claim 13, wherein the fullest component within the plurality of storage components is the component having the highest percent range of hot pages, wherein the least full component within the plurality of storage components is the component having the lowest percent range of hot pages.

16. The storage controller of claim 13, wherein the processor calculates the percent range of hot pages and cold pages in the linked list for each component in the plurality of storage components comprises the processor:
 determines a number of hot pages and a number of cold pages in the linked list, wherein hot pages have more than a first predetermined threshold of IOs per time period, wherein cold pages have less than a second predetermined threshold of IOs per time period;
 calculates a percent hot and a percent cold for the storage component, wherein the percent hot is the number of hot pages divided by the total number of pages in the storage component, and the percent cold equals the number of cold pages divided by the total number of pages in the storage component; and
 calculates a numeric range within a one hundred percent scale for the hot pages and the cold pages, wherein the numeric range for the hot pages is the percent range of hot pages in the linked list and the numeric range for the cold pages is the percent range of cold pages in the linked list.

17. The storage controller of claim 16, wherein the first predetermined threshold of IOs per time period is greater than the second predetermined threshold of IOs per time period.

18. The storage controller of claim 16, wherein the first predetermined threshold of IOs per time period is equal to the second predetermined threshold of IOs per time period.

19. The storage controller of claim 13, wherein the processor maintains the linked list for each component in the plurality of storage components in the storage tier comprises the processor:
 in response to receiving a read or write request, the processor generates an I/O request to a current page, wherein the current page comprises a logical block address (LBA) specified by the read or write request;
 calculating a page rank for the current page, a previous page, and a next page, wherein the current page is designated by a current page identifier in the linked list, wherein the previous page is designated by a previous page identifier in the linked list, wherein the next page is designated by a next page identifier in the linked list, wherein the previous page identifier is sequentially adjacent to the current page identifier and corresponds to a lower logical block address than the current page identifier, wherein the next page identifier is sequentially adjacent to the current page identifier and corresponds to a higher logical block address than the current page identifier;
  if the page rank for the current page is greater than the page rank for the previous page, exchanging the current page identifier with the previous page identifier in the linked list;
  if the page rank for the current page is not greater than the page rank for the previous page, and the page rank for the current page is less than the page rank for the next page, exchanging the current page identifier with the next page identifier in the linked list; and
  if the page rank for the current page is not greater than the page rank for the previous page, and the page rank for the current page is not less than the page rank for the next page, forgoing exchanging the current page identifier with the next page identifier in the linked list.

20. The storage controller of claim 19, wherein each page is associated with an I/O counter and one or more time stamps, wherein one or more time stamps store the historical time that an I/O request was issued to the page, wherein calculating page rank comprises the storage controller:
- copies each time stamp for the page to the next older timestamp for the page, if more than one time stamp is associated with the page;
- stores the current time to the most recent time stamp for the page;
- increments the I/O counter for the page, wherein the I/O counter stores the number of I/O requests to the page by the storage controller;
- subtracts the oldest time stamp for the page from the current time to determine an LRU-N value for the page;
- subtracts the LRU-N value for the page from a predetermined number to determine an MRU-N value for the page; and
- adds the MRU-N value for the page to the I/O counter value for the page.

\* \* \* \* \*